US010094706B2

(12) United States Patent
Zigovszki et al.

(10) Patent No.: US 10,094,706 B2
(45) Date of Patent: Oct. 9, 2018

(54) MODE ACTIVATION USING LIGHT DETECTION

(71) Applicant: Mueller International, LLC, Atlanta, GA (US)

(72) Inventors: Szabolcs Zigovszki, Mableton, GA (US); Ian Phillip Harvey, Bristol (GB); Francis J. Stifter, Jr., Hampton Falls, NH (US)

(73) Assignee: Mueller International, LLC, Atlanta, GA (US)

( * ) Notice: Subject to any disclaimer, the term of this patent is extended or adjusted under 35 U.S.C. 154(b) by 147 days.

(21) Appl. No.: 14/490,381

(22) Filed: Sep. 18, 2014

(65) Prior Publication Data

US 2016/0084680 A1 Mar. 24, 2016

(51) Int. Cl.
*G01D 4/00* (2006.01)
*G01D 3/08* (2006.01)
*G01J 1/02* (2006.01)

(52) U.S. Cl.
CPC .............. *G01J 1/0204* (2013.01); *G01D 3/08* (2013.01); *G01D 4/00* (2013.01)

(58) Field of Classification Search
CPC .......... G01D 11/00; G01D 18/00; G01D 7/00; G01J 1/02; G01J 1/0204
USPC ....................................................... 73/866.1
See application file for complete search history.

(56) References Cited

U.S. PATENT DOCUMENTS

| | | | |
|---|---|---|---|
| 676,656 A | 6/1901 | Haas | |
| 3,045,486 A | 7/1962 | Thomas et al. | |
| 3,067,612 A | 12/1962 | Smith | |
| 3,308,664 A | 3/1967 | Kullmann | |
| 4,663,970 A | 5/1987 | Sutherland | |
| 4,995,643 A | 2/1991 | Rappart et al. | |
| 5,086,292 A | 2/1992 | Johnson | |
| 5,099,348 A * | 3/1992 | Huddleston | G01R 31/2834 398/107 |
| 5,339,686 A | 8/1994 | Dejarlais et al. | |
| 5,473,322 A | 12/1995 | Carney | |
| 5,631,554 A | 5/1997 | Briese | |
| 5,706,273 A | 1/1998 | Guerreri | |
| 5,910,653 A * | 6/1999 | Campo | G06F 3/147 250/205 |
| 6,588,447 B1 | 7/2003 | Hendey | |

(Continued)

FOREIGN PATENT DOCUMENTS

| | | |
|---|---|---|
| EP | 0359665 | 12/1992 |
| KR | 100959519 | 5/2010 |

OTHER PUBLICATIONS

Cullinan, Thomas; U.S. Patent Application entitled: Solid-State Register Initiated Poll of Status Information having U.S. Appl. No. 14/954,322, filed Nov. 30, 2015, 26 pgs.

(Continued)

*Primary Examiner* — Walter L Lindsay, Jr.
*Assistant Examiner* — Philip Marcus T Fadul
(74) *Attorney, Agent, or Firm* — Taylor English Duma LLP

(57) ABSTRACT

Technologies are described herein for activating one or more operating modes of a register in a meter. The register is operated in a first mode. Light detections indicating whether the register is exposed to light or isolated from light are read. It is determined whether a condition is met based on the light detections. Upon determining that the condition is met, operating the register in a second mode.

17 Claims, 5 Drawing Sheets

(56) References Cited

U.S. PATENT DOCUMENTS

| | | |
|---|---|---|
| 6,774,807 B1 | 8/2004 | Lehfeldt |
| 7,007,558 B1 | 3/2006 | Carpenter |
| 7,565,255 B2 | 7/2009 | Kanke |
| 8,344,881 B1 | 1/2013 | Hays |
| 9,476,740 B2 | 10/2016 | Zigovszki |
| 9,671,254 B2 | 6/2017 | Zigovszki et al. |
| 9,891,088 B2 | 2/2018 | Zigovszki et al. |
| 2002/0126157 A1* | 9/2002 | Farago .................. G01D 4/002 715/810 |
| 2002/0193144 A1 | 12/2002 | Belski et al. |
| 2003/0193405 A1* | 10/2003 | Hunt ..................... G01D 4/004 340/870.02 |
| 2004/0021568 A1 | 2/2004 | Seal et al. |
| 2005/0066746 A1 | 3/2005 | Winter |
| 2007/0229256 A1 | 10/2007 | Seal et al. |
| 2007/0241930 A1 | 10/2007 | Qureshi et al. |
| 2010/0245309 A1* | 9/2010 | Matsuki .................... G01J 1/02 345/207 |
| 2010/0321205 A1 | 12/2010 | Olson et al. |
| 2011/0115643 A1 | 5/2011 | Gilbert |
| 2012/0074927 A1 | 3/2012 | Ramirez |
| 2013/0088353 A1 | 4/2013 | Lafrance |
| 2013/0113631 A1 | 5/2013 | Pitchford |
| 2013/0257630 A1 | 10/2013 | Brennan |
| 2014/0028465 A1 | 1/2014 | Cornwall |
| 2014/0281624 A1* | 9/2014 | Cahill-O'Brien et al. ................. G06F 1/3234 713/323 |
| 2014/0282550 A1 | 9/2014 | Blumenfeld et al. |
| 2014/0361908 A1 | 12/2014 | Laird et al. |
| 2017/0153123 A1 | 6/2017 | Cullinan |

OTHER PUBLICATIONS

Zigovszki, Szabolcs; International Search Report and Written Opinion for serial No. PCT/US15/44156, filed Mar. 7, 2015, dated Nov. 6, 2015, 9 pgs.

Zigovszki, Szabolcs; International Search Report and Written Opinion for serial No. PCT/US15/50080, filed Sep. 15, 2015, dated Dec. 10, 2015, 8 pgs.

Zigovszki, Szabolcs; International Search Report and Written Opinion for serial No. PCT/US15/44147, filed Aug. 7, 2015, dated Nov. 6, 2015, 8 pgs.

Martin, Cole; International Search Report and Written Opinion for Application No. PCT/US15/44154, filed Aug. 7, 2015, dated Dec. 31, 2015, 12 pgs.

Zigovszki, Szabolcs; Non-Final Office Action for U.S. Appl. No. 14/490,403, filed Sep. 18, 2014, dated Mar. 31, 2016, 26 pgs.

Zigovszki, Szabolcs; Non-Final Office Action for U.S. Appl. No. 14/490,412, filed Sep. 18, 2014, dated Apr. 1, 2016, 21 pgs.

Zigovszki, Szabolcs; PCT Application entitled: Real-Time Flow Compensation in Usage Accumulcation having serial No. PCT/US15/44156, filed Aug. 7, 2015, 26 pgs.

Zigovszki, Szabolcs; PCT Application entitled: Tamper Detection Through Magnetic Sensing having serial No. PCT/US15/50080, filed Sep. 15, 2015, 26 pgs.

Zigovszki, Szabolcs; PCT Application entitled: Reverse Flow Detection and Annunication having serial No. PCT/US15/44147, filed Aug. 7, 2015, 24 pgs.

Martin, Cole; PCT Application entitled: Adjustable Meter With Tamper Detection having serial No. PCT/US15/44154, field Aug. 7, 2015, 35 pgs.

Zigovszki, Szabolcs; U.S. Patent Application entitled: Real-Time Flow Compensation in Usage Accumulation, U.S. Appl. No. 14/490,375, filed Sep. 18, 2014, 28 pgs.

Zigovszki, Szabolcs; U.S. Patent Application entitled: Tamper Detection Through Magnetic Sensing, U.S. Appl. No. 14/490,403, filed Sep. 18, 2014; 24 pgs.

Zigovszki, Szabolcs; U.S. Patent Application entitled: Reverse Flow Detection and Annunciation, U.S. Appl. No. 14/490,412, filed Sep. 18, 2014; 26 pgs.

Cole, Martin; U.S. Patent Application Entitled: Adjustable Meter With Tamper Detection, U.S. Appl. No. 14/490,095, filed Sep. 18, 2014; 36 pgs.

Zigovszki, Szabolcs; Applicant Initiated Interview Summary for U.S. Appl. No. 14/490,403, filed Sep. 18, 2014, dated Dec. 1, 2016, 7 pgs.

Cullinan, Thomas; Non-Final Office Action for U.S. Appl. No. 14/954,322, filed Nov. 30, 2015, dated Nov. 2, 2016; 37 pgs.

Zigovszki, Szabolcs; Final Office Action for U.S. Appl. No. 14/490,403, filed Sep. 18, 2014, dated Oct. 3, 2016, 23 pgs.

Zigovszki, Szabolcs; Corrected Notice of Allowability for U.S. Appl. No. 14/490,412, filed Sep. 18, 2014, dated Sep. 20, 2016, 7 pgs.

Zigovszki, Szabolcs; Issue Notification for U.S. Appl. No. 14/490,412, filed Sep. 18, 2014, dated Oct. 5, 2016, 1 pg.

Cole, Martin; Final Office Action for U.S. Appl. No. 14/490,095, filed Sep. 18, 2014; dated Oct. 6, 2016; 16 pgs.

Zigovszki, Szabolcs; Corrected Notice of Allowability for U.S. Appl. No. 14/490,412, filed Sep. 18, 2014, dated Aug. 3, 2016, 4 pgs.

Zigovszki, Szabolcs; Notice of Allowance for U.S. Appl. No. 14/490,412, filed Sep. 18, 2014, dated Jul. 11, 2016, 9 pgs.

Cole, Martin; Applicant Initiated Interview Summary for U.S. Appl. No. 14/490,095, filed Sep. 18, 2014, dated Jul. 6, 2016, 3 pgs.

Cole, Martin; Non-Final Office Action for U.S. Appl. No. 14/490,095, filed Sep. 18, 2014, dated Jun. 15, 2016, 24 pgs.

Zigovszki,Szaboles; Non-final Office Action for U.S. Appl. No. 14/490,375, filed Sep. 18, 2014, dated Apr. 24, 2017, 47 pgs.

Zigovszki, Szabolcs; Corrected Notice of Allowability for U.S. Appl. No. 14/490,403, filed Sep. 18, 2014, dated May 5, 2017, 10 pgs.

Zigovszki, Szabolcs; Issue Notiication for U.S. Appl. No. 14/490,403, filed Sep. 18, 2014, dated May 17, 2017, 2 pgs.

Zigovszki, Szaboles; Corrected Notice of Allowability for U.S. Appl. No. 14/490,403, filed Sep. 18, 2014, dated Apr. 21, 2017, 6 pgs.

Cullinan,Thomas; Applicant-Initiated Interview Summary for U.S. Appl. No. 14/954,322, filed Nov. 30, 2015, dated May 17, 2017, 3 pgs.

Cullinan,Thomas; Final Office Action for U.S. Appl. No. 14/954,322, filed Nov. 30, 2015, dated Apr. 10, 2017, 29 pgs.

Zigovszki, Szabolcs; International Preliminary Report on Patentability for Application No. PCT/US15/44156, filed Mar. 7, 2015, dated Aug. 30, 2017, 8 pgs.

Zigovszki, Szabolcs; International Preliminary Report on Patentability for Application No. PCT/US15/50080, filed Sep. 15, 2015, dated Mar. 30, 2017, 7 pgs.

Zigovszki, Szabolcs; International Preliminary Report on Patentability for Application No. PCT/US15/44147, filed Aug. 7, 2015, dated Mar. 30, 2017, 7 pgs.

Cullinan, Thomas; Advisory Action for U.S. Appl. No. 14/954,322, filed Nov. 30, 2015, dated Jun. 20, 2017, 8 pgs.

Zigovszki, Szaboles; Notice of Allowance for U.S. Appl. No. 14/490,403, filed Sep. 18, 2014, dated Feb. 6, 2017, 9 pgs.

Cole, Martin; Notice of Allowance for U.S. Appl. No. 14/490,095, filed Sep. 18, 2014, dated Jan. 13, 2017, 13 pgs.

Zigovszki, Szabolcs; Applicant Initiated Interview Summary for U.S. Appl. No. 14/490,375, filed Sep. 18, 2014, dated Sep. 13, 2017, 3 pgs.

Zigovszki, Szabolcs; Final Office Action for U.S. Appl. No. 14/490,375, filed Sep. 18, 2014, dated Aug. 1, 2017, 22 pgs.

Zigovszki, Szabolcs; Notice of Allowance for U.S. Appl. No. 14/490,375, filed Sep. 18, 2017, dated Oct. 4, 2017, 8 pgs.

Cullinan, Thomas; Applicant-Initiated Interview Summary for U.S. Appl. No. 14/954,322, filed Nov. 30, 2015, dated Oct. 5, 2017, 3 pgs.

Cullinan, Thomas; Non-Final Office Action for U.S. Appl. No. 14/954,322, filed Nov. 30, 2015, dated Sep. 18, 2017, 24 pgs.

Zigovszki, Szabolcs; Issue Notification for U.S. Appl. No. 14/490,375, filed Sep. 18, 2014, dated Jan. 24, 2018, 1 pg.

(56) References Cited

OTHER PUBLICATIONS

Cullinan, Thomas; Notice of Allowance for U.S. Appl. No. 14/954,322, filed Nov. 30, 2015, dated Jan. 22, 2018, 14 pgs.

* cited by examiner

MODE ACTIVATION USING LIGHT DETECTION

BACKGROUND

Conventional water, gas, or other utility meters normally include a mechanical register for accumulating and displaying usage data for customers and utility provider personnel (e.g., meter readers). A typical register may include odometer-style wheels and/or dials that collectively record the total volume of product used. These registers may be driven by a mechanical or magnetic coupling with a measuring element inside of a measuring chamber of the meter. Gears in the register convert the motion of the measuring element to the proper usage increment for display on the dials and/or wheels. The mechanical register may further include a means of converting the current position of the dials and wheels to an electronic signal for sending the current usage data electronically to automatic meter reading ("AMR") or advanced metering infrastructure ("AMI") systems for remote reading and/or monitoring of the metered consumption.

As an alternative to mechanical registers, a solid-state register ("SSR") may be utilized in meters by a utility provider. SSRs are totally electronic with no mechanical gearing or moving parts and may interface magnetically with the measuring element inside of the measuring chamber of the meter. The SSR uses electronics and firmware programming to detect flow, accumulate usage, and display usage on an LCD or other electronic display. Other operational metrics beyond usage may also be determined and/or displayed, such as average flow rate, instant flow rate, reverse flow, and the like. The programmatic nature of the SSR may allow a single model of register to be programmed with the appropriate parameters and scaling factors to work with a variety of meters and provide higher consumption resolution and accuracy than mechanical odometer registers. SSRs may also provide for the implementation of features not available in traditional mechanical registers, such as accumulation, display, and reporting of operational metrics beyond usage, alarming capability via AMR/AMI systems for tamper conditions and reverse flow, and the like.

It is with respect to these and other considerations that the disclosure made herein is presented.

BRIEF SUMMARY

The present disclosure relates to technologies for activating one or more operating modes using light detection. According to some embodiments, a method for activating one or more operating modes of a register in a meter comprises operating the register in a first mode. Light detections indicating whether the register is exposed to light or isolated from light are read. Whether a condition is met based on the light detections is determined. Upon determining that the condition is met, the register is operated in a second mode.

According to further embodiments, a computer-readable storage medium comprises processor-executable instructions that, when executed by a processing unit in a meter, causes the processing unit to operate a register in a first mode. The processing unit reads light detections indicating whether the register is exposed to light or isolated from light. The processing unit determines whether a condition is met based on the light detections. Upon determining that the condition is met, the processing unit operates the register in a second mode.

According to further embodiments, a register for use in a meter comprises an optical sensor configured to generate outputs indicative of detected light levels and a microcontroller connected to the optical sensor. The microcontroller is configured to operate the register in a first mode, determine whether a condition is met based on the outputs, and upon determining that the condition is met, operate the register in a second mode.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for using light detection to activate one or more operating modes. Using the technologies described herein, a solid-state register ("SSR") for use in a utility meter may be configured to determine whether a condition, such as a wake-up condition, mode activation condition, and/or display condition, is met based on detected lighting conditions. Upon determining that the condition is met, the SSR may be configured to activate or transition to an operating mode or state, such as a sleep state, test mode, normal display mode, programming mode or the like. In some embodiments, the SSR may be configured to determine that the detected lighting conditions indicate that the condition was unintentionally met, such as when the SSR is exposed to flickering fluorescent lighting, and avoid activating one or more operating modes based on the unintentional condition. By implementing the mode activation routine(s) described herein, the power consumption of the SSR may be conserved and the ability of installers, meter readers, and other users of the SSR to install, operate, read, repair, and test the SSR may be improved.

Figure 1:
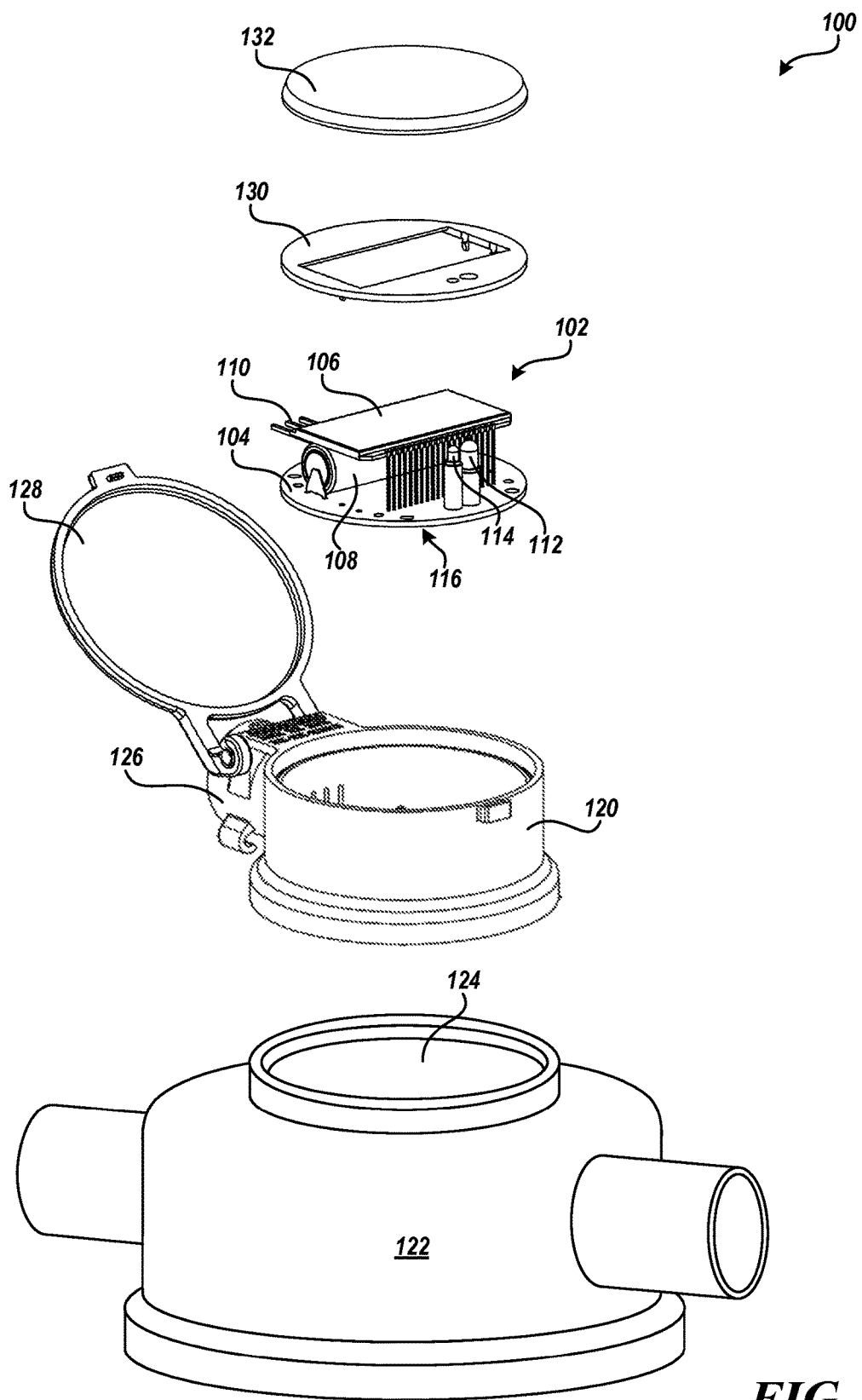
FIG. 1 is a perspective view showing an assembly of an illustrative water meter including a solid-state register, according to embodiments described herein.

FIG. 1 is a perspective view showing an assembly of an illustrative water meter 100 that implements an SSR 102, according to some embodiments. According to embodiments, the SSR 102 comprises a printed circuit board ("PCB") 104 upon which various components are attached. In some embodiments, the SSR 102 may include a liquid crystal display ("LCD") 106 or other electronic display connected to the PCB 104. The LCD 106 may display the accumulated usage to a local observer, such as a customer, installer, meter reader, or other utility provider personnel. The LCD 106 may also display other operational parameter information, such as flow rates, meter ID, model number of the meter 100 and/or SSR 102, test mode accumulation, error codes, and the like. The LCD 106 may further indicate status information for the meter, such as units of measurement displayed, error conditions, flow direction, current operation mode, battery condition, and the like.

The SSR 102 may further include a battery 108 for powering the operation of the electronic components of the SSR. In some embodiments, the power requirements of the SSR 102 may allow the battery 108 to power the SSR for an extended period of time in normal operation, such as 20 years. The SSR 102 may also include an interface connector 110 for electronically connecting the SSR to an external device, such as an AMR or AMI communication device, a portable programming device, or the like. In some embodiments, the interface connector 110 may comprise a three-wire connector. The SSR 102 may also include an optical sensor 112 or photo-detector. The optical sensor 112 may allow the SSR 102 to detect light conditions within the meter 100 in order to determine the correct mode for operation, as described in further detail below. The optical sensor 112 may also serve as an infrared ("IR") detector. The SSR 102 may further include an IR emitter 114, which together with the optical sensor 112, provides an IR port for the SSR to communicate with external devices via IR, such as portable programming devices and the like.

The SSR 102 may be shaped and sized to be inserted into an enclosure 120. The enclosure may be mechanically configured to be attached to the measuring chamber 122 of the meter 100, such that a bottom surface 116 of the PCB 104 is within a defined distance of a top surface 124 of the measuring chamber. The bottom surface 116 of the PCB 104 may hold flow sensors and other detection devices that interface with a magnetic measuring element within the measuring chamber 122, such as rotating magnetic disc. The SSR 102 and the enclosure 120 may be configured to be compatible with a variety of measuring chambers 122 for a variety of models and types of meters 100.

Once positioned in the enclosure 120, the SSR 102 may be covered by a faceplate 130 and lens 132. The faceplate may include openings for the LCD 106, the optical sensor 112, and the IR emitter 114. The lens 132 may be sealed to the enclosure 120 in order to protect the SSR 102 from liquids or other external contaminants. The enclosure 120 may further include a recess 126 through which the interface connector 110 may extend allowing the SSR 102 to be connected to the external devices. The enclosure 120 may also include a cover 128 or lid which may be closed over the SSR 102 in order to protect the lens 132 as well as isolate the optical sensor 112 from external light sources. In certain embodiments, when the cover 128 is closed over the SSR 102, the amount of light received by the optical sensor 112 is at a sufficiently low level for the SSR to consider it a dark environment, even under full sun exposure.

Figure 2:
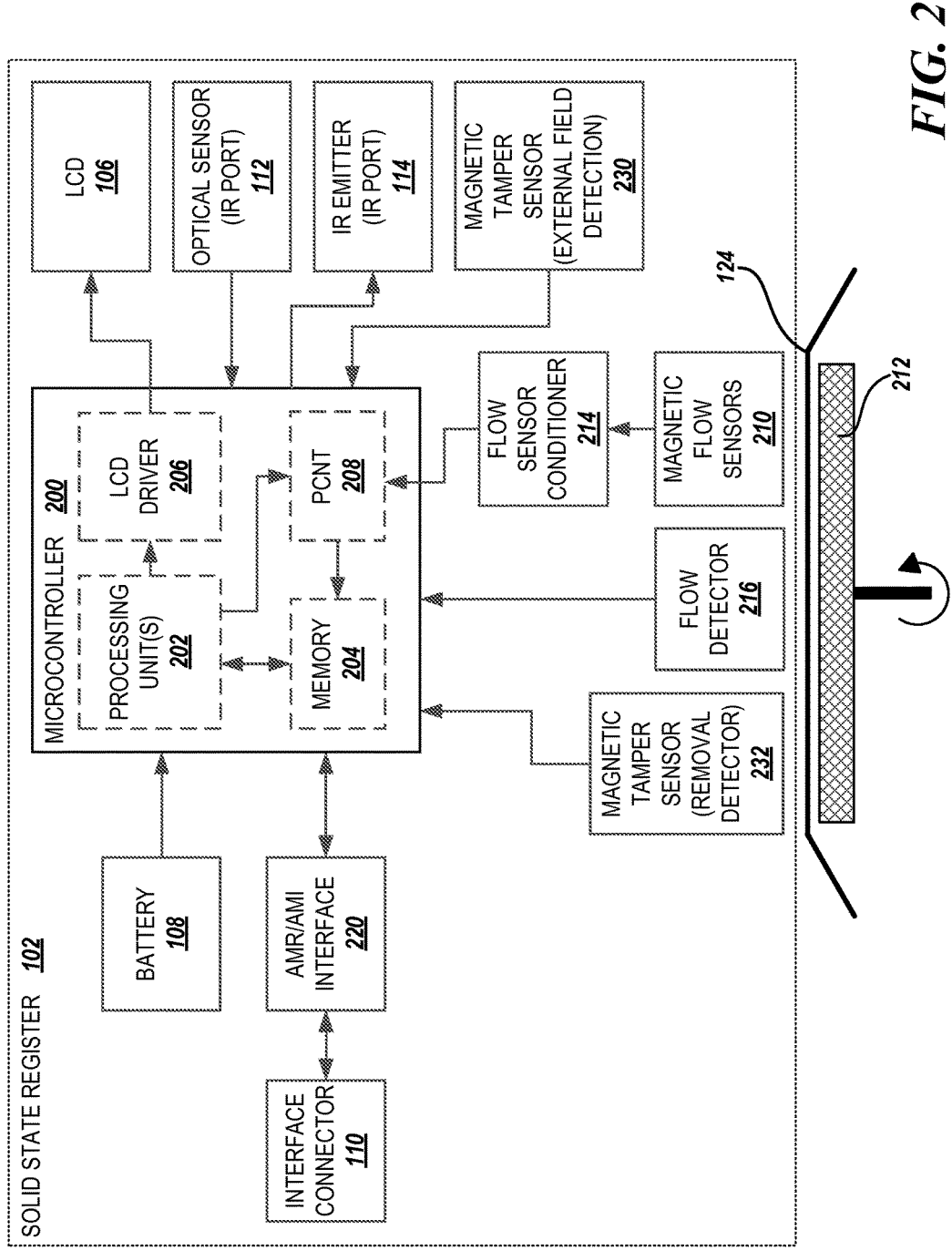
FIG. 2 is a block diagram of an illustrative solid-state register capable of executing the software components described herein for activating one or more modes using light detection, according to embodiments described herein.

FIG. 2 shows a block diagram of the SSR 102, according to some embodiments. The SSR 102 includes a microcontroller 200 for performing the functions of the SSR as described herein. The microcontroller 200 may be a microcontroller unit ("MCU") designed for smart meter applications, such as the MC9S08GW64 from Freescale Semiconductor of Austin, Tex. The microcontroller 200 contains a variety of modules in a single, integrated circuit, including one or more processing units 202. The processing unit(s) 202 represent standard programmable processors that perform arithmetic and logical operations necessary for the operation of the SSR 102. The processing unit(s) 202 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The microcontroller 200 further includes a memory 204. The memory 204 may comprise a computer-readable storage medium for storing processor-executable instructions, data structures and other information. The memory 204 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 204 may store a firmware that comprises instructions, commands and data necessary for operation of the SSR 102. According to some embodiments, the memory 204 may store processor-executable instructions that, when executed by the processing units 202, perform the routines 600 and 700 for compensating for inaccuracies in flow measurement in real-time during accumulation of usage, as described herein.

In addition to the memory 204, the microcontroller 200 may have access to other computer-readable media storing program modules, data structures, and other data described herein for using light detection to activate one or more operating modes. It will be appreciated by those skilled in the art that computer-readable media can be any available media that may be accessed by the microcontroller 202 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

The microcontroller 200 may further include an integrated LCD driver 206 for driving the LCD 106 or other electronic display to display accumulated usage information, operations parameters, error codes, status information, and the like. In some embodiments, the LCD 106 may comprise an LCD panel specifically designed for utility meter applications, such as the W527110 LCD panel from Truly Semiconductors Ltd. of Kwai Chung, Hong Kong. The microcontroller 200 may also include an integrated pulse counter unit 208, also referred to as a position counter ("PCNT"). The pulse counter unit 208 is a low power pulse sequence counter that receives one or more input signals from magnetic flow sensors 210 in the SSR 102. The magnetic flow sensors 210 may represent rotational sensors that sense the rotation of the measurement device, such as a rotating magnet 212, contained in the measurement chamber 122 of the meter 100. The magnetic flow sensors 210 send signals, or "pulses," based on the sensed rotation of the rotating magnet 212 to the pulse counter unit 208 that allow the pulse counter unit to accumulate a pulse count representing a volume of water, gas, electricity, or other product flowing through the meter 100.

In some embodiments, the magnetic flow sensors 210 may comprise a tunneling magnetoresistance ("TMR") angle sensor, such as the NVE AAT001-10E from NVE Corporation of Eden Prairie Minn. The TMR sensor may provide rotational position measurements in a rotating magnetic field that provides the necessary pulse sequences to the pulse counter unit 208 for the pulse counter unit to determine both the flow direction and quantity of the flow. The magnetic flow sensors 210 may be mounted on the bottom surface 116 of the PCB 104 such that it is in proximity of the magnetic field created by the rotating magnet 212 through the top surface 124 when the enclosure 120 containing the SSR 102 is coupled to the measurement chamber 122. According to some embodiments, the signals from the magnetic flow sensors 210 may be pre-processed by a flow sensor conditioner 214 before being provided to the pulse counter unit 208. For example the signals from the magnetic flow sensors 210 may pass through a dual push-pull comparator, such as the Microchip MCP6542 from Microchip Technology Inc. of Chandler, Ariz.

In some embodiments, the pulse counter unit 208 may be configured to operate in a two-signal gray mode (also referred to as quadrature mode) to detect and accumulate pulse counts for both forward and reverse flows. Once configured by the firmware, the pulse counter unit 208 may run independently of the processing units as long as flow is detected in the meter 100. According to some embodiments, the pulse counter unit 208 may maintain two distinct registers in the microcontroller's memory 204 or processing unit(s) 202, one forward flow pulse counter and one reverse flow pulse counter.

According to some embodiments, the SSR 102 further includes a flow detector 216. The flow detector 216 may comprise a low-power reed switch or other sensor that detects a change in the magnetic field from the rotating magnet 212 and signals the microcontroller 200 to provide power to the magnetic flow sensors 210 and/or to activate the pulse counting unit 208. In this way, the SSR 102 may operate in an extremely low power mode when no flow is detected to preserve the life of the battery 108. As with the magnetic flow sensors 210, the flow detector 216 may be mounted on the bottom surface 116 of the PCB 104 such that it is in proximity of the magnetic field created by the rotating magnet 212 through the top surface 124 of the measurement chamber 122.

The microcontroller 200 may further connect with other components of the SSR 102 through a variety of interfaces of the microcontroller. For example, the microcontroller 200 interfaces with the optical sensor 112 described above in order to detect changes in external light conditions in order to switch the SSR 102 to the appropriate mode of operation, as described in further detail below. In some embodiments, the optical sensor 112 may comprise a phototransistor, such as the PT333-3C from Everlight Electronics Co., Ltd. of New Taipei City, Taiwan. In further embodiments, the microcontroller 200 may further utilize interfaces with the optical sensor 112 and the IR emitter 114 to provide an IR port for two-way communication with external devices, for configuration of the SSR 102, updating of the firmware, and the like.

The microcontroller 200 may further include an AMR/AMI interface 220 for communicating with an external device through the interface connector 110, such as an AMR or AMI communication device, a portable programming device, or the like. The AMR/AMI interface 220 may provide for receiving and responding to interrogatories and commands from the external device, such as a request for accumulated usage data or current status information regarding the SSR. The AMR/AMI interface 220 may further allow the microcontroller 200 to initiate communication with the external device, according to further embodiments. In some embodiments, the AMR/AMI interface 220 may utilize a universal asynchronous receiver/transmitter ("UART") module integrated in the microcontroller 200 to provide a 3-wire, two-way serial interface with the external device.

In some embodiments, the SSR 102 may include a number of magnetic tamper sensors, such as magnetic tamper sensors 230 and 232, that interface with the microcontroller 200. For example, an external field detection sensor 230 may interface with the microcontroller 200 and provide a signal when the SSR 102 is subject to an external magnetic field. The external field detection sensor 230 may comprise a digital output magnetic sensor, such as the TCS20DPR from Toshiba of Tokyo, Japan, that may provide an indication of the relative strength of the detected magnetic field. Additionally or alternatively, a removal detector sensor 232 may interface with the microcontroller 200 and provide a signal indicating if the detector is removed from the magnetic field of the rotating magnet 212, indicating that the SSR 102 may have been dislodged or removed from the measurement chamber 122 of the meter 100. In some embodiments, the removal detector sensor 232 may comprise a three-axis digital magnetometer, such as the MAG3110 from Freescale Semiconductor. As with the magnetic flow sensors 210 and the flow detector 216, the removal detector sensor 232 may be mounted on the bottom surface 116 of the PCB 104 such that it is in proximity of the magnetic field created by the rotating magnet 212 through the top surface 124 of the measurement chamber 122.

It will be appreciated that the structure and/or functionality of the SSR 102 may be different than that illustrated in FIG. 2 and described herein. For example, while the processing unit(s) 202, memory 204, LCD driver 206, and pulse counter unit 208 are shown as modules integrated into the microcontroller 200, these components may represent discrete circuitry or components, or may be distributed among multiple integrated circuit packages. Similarly, the microcontroller 200, the flow sensor conditioner 214, the AMR/AMI interface 220 and other components of the SSR 102 may be integrated within a common integrated circuit package or distributed among multiple integrated circuit packages. The illustrated connection pathways are provided for purposes of illustration and not of limitation, and some components and/or interconnections may be omitted for purposes of clarity. It will be further appreciated that the SSR 102 may not include all of the components shown in FIG. 2, may include other components that are not explicitly shown in FIG. 2 or may utilize an architecture completely different than that shown in FIG. 2.

Figure 3:
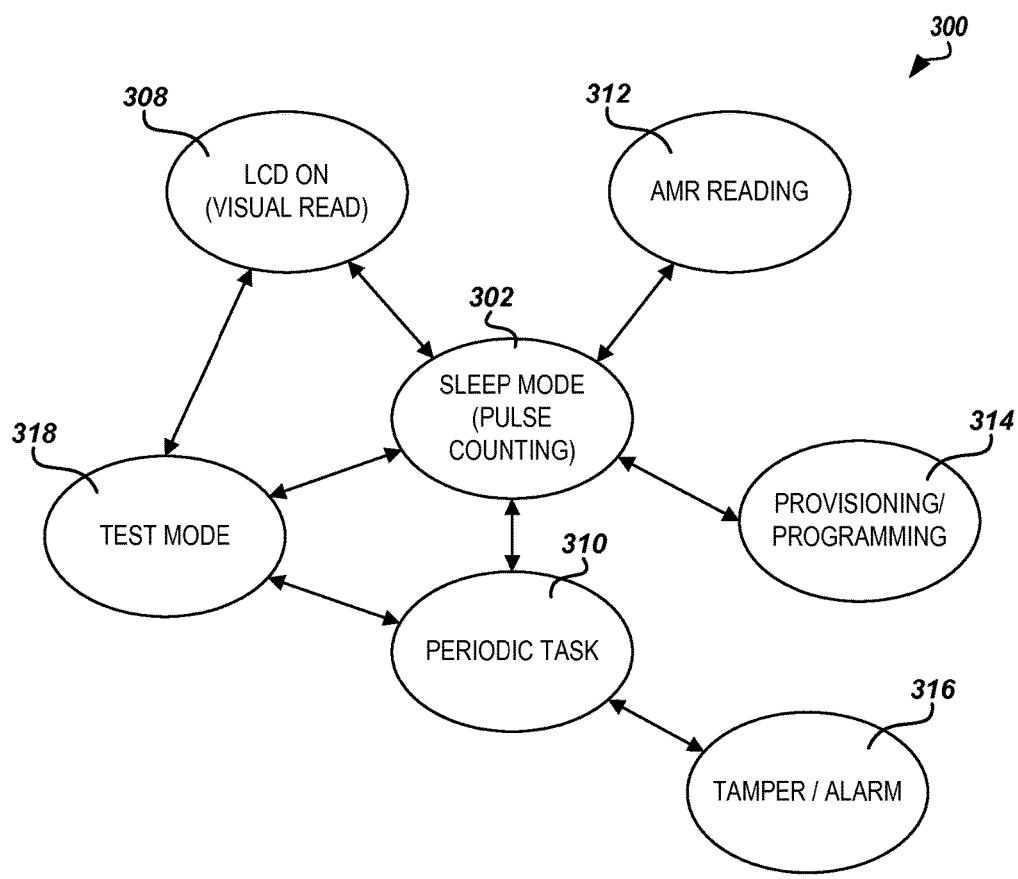
FIG. 3 is state diagram showing exemplary states or operating modes of a solid-state register, according to embodiments described herein.

FIG. 3 is a state diagram showing exemplary states 300 or modes of the SSR 102. According to embodiments, the SSR 102 may be configured to operate most of the time in a sleep mode 302, wherein the microcontroller 200 may cut power to certain components in order to conserve power consumption and maximize the life of the battery 108. In some embodiments, the SSR 102 may be configured to perform the pulse counting function while in the sleep mode 302. The magnetic flow sensors 210 are active and send signals to the pulse counter unit 208 that allow the pulse counter unit 208 to accumulate a pulse count as described above. By always performing the pulse counting function in the sleep mode 302, the need for the flow detector 216 is obviated, simplifying the design of the SSR 102. In addition, accuracy of the SSR 102 may be improved since pulses will not be lost while transition from sleep mode 302 without pulse counting to sleep mode with pulse counting.

In other embodiments, the SSR 102 may operate in a sleep mode 302 without pulse counting. The microcontroller 200 may disable power to the magnetic flow sensors 210 to conserve power. The microcontroller 200 may periodically sample the flow detector 216 to determine if a change in the magnetic field from the rotating magnet 212 has been detected. Upon detecting a magnetic field change in flow detector 216, the microcontroller 200 is configured to activate the magnetic flow sensors 210 within a period of time, such as 6 microseconds, that is shorter than the time period between two pulse counts. As a result, the pulse counter unit 208 may only need to add one pulse to the pulse count to compensate for the pulse that generated the activation of the magnetic flow sensors 210. In some embodiments, if no flow is detected by the magnetic flow sensors 210 for a predetermined period, such as 30 seconds, the microcontroller 200 may turn off the magnetic flow sensors 210 and the SSR 102 may transition back to the sleep mode 302 without pulse counting state to conserve power.

During the sleep mode 302, the SSR 102 may enter a periodic task state 310 periodically, such as every 1 second or every 2 seconds, or at other predetermined times. During the periodic task state 310, the microcontroller 200 may sample various sensors, such as the flow detector 216, the optical sensor 112, and/or the magnetic tamper sensors 230, 232, described above. For example, the microcontroller 200 may sample the flow detector 216 in order to activate the magnetic flow sensors 210 to perform the pulse counting function, as described above.

The microcontroller 200 may further sample the optical sensor 112 to determine if a wake-up condition has been detected. In accordance with certain embodiments, upon detecting a wake-up condition using the optical sensor 112 (as described in further detail below), the SSR 102 may transition from the sleep mode 302 to a display mode, referred to herein as the LCD on state 308. In the LCD on state 308, the microcontroller 200 may activate or turn on the LCD 106 and the LCD may display consumption information, such as total flow volume using pre-programmed measurement units (e.g., gallons, cubic feet, cubic meters, liters, or imperial gallons) and/or rate of flow using pre-programmed measurement units (e.g., gallons/min, cubic feet/min, cubic meters/min, liters/min, or imperial gallons/min).

In some embodiments, the microcontroller 200 may send signals to the LCD 106 that allow the LCD 106 to update the consumption information at regular intervals. For example, the total flow volume may be updated every 125 milliseconds and the rate of flow may be updated every 125 milliseconds. During the LCD on state 308, the SSR 102 may enter the periodic task state 310 periodically or at other predetermined times wherein the microcontroller 200 may sample various sensors, such as the flow detector 216, the optical sensor 112, and/or one or more of the magnetic tamper sensors 230, as described above. During the LCD on state 308, the SSR 102 may enter the periodic task state more frequently than when in the sleep mode 302, such as every 125 milliseconds as compared to every 1 second or every 2 seconds. In some embodiments, if no wake-up condition is detected by the optical sensor 112 for a predetermined period, such as 30 seconds, the SSR 102 may transition back to the sleep mode 302 to conserve power.

During the periodic task 310, the microprocessor 200 may additionally or alternatively sample one or more of the magnetic tamper sensors 230, 232 to determine if a tamper has been detected. In certain embodiments, upon detecting a tamper using one or more of the magnetic tamper sensors 230 and/or 232, the SSR 102 may transition from the periodic task 310 to a tamper or alarm state 316. In this state, the microcontroller 200 may provide a signal to the LCD 104 to display an error message indicating a magnetic tamper. In addition or alternatively, the microcontroller 200 may provide a signal to the AMR/AMI interface 220 to include an error flag in an AMR message indicating a magnetic tamper. It will be appreciated that, in accordance with some embodiments, various other sensors may be connected to the microprocessor 200 and used to detect errors or alarms, and that the SSR 102 may be configured to enter the tamper or alarm state 316 upon detection of such errors or alarms and provide signals indicating such errors or alarms through codes, messages, icons, lights, or the like.

In some embodiments, the SSR 102 may be configured to operate in an AMR reading state 312. In addition or alternatively, the SSR 102 may be configured to operate in a provisioning or programming state 314. During the sleep mode(s) 302, the microcontroller 200 may monitor the AMR/AMI interface 220 for certain signals. For example, the AMR/AMI interface 220 may provide an output, such as a binary output, to the microcontroller 200 that signals the microcontroller 200 to activate certain functions. In some embodiments, upon detecting a logic "high" output from the AMR/AMI interface 220 for a predetermined period of time, such as longer than 200 milliseconds but shorter than one second, the microcontroller 200 initiates communication with an AMR/AMI device and the SSR 102 enters the AMR reading state 312. During this state, the SSR 102 may send and receive AMR messages. In addition or alternatively, upon detecting a logic "high" output from the AMR/AMI interface 220 for a predetermined period of time, such as longer than one second, the microcontroller 200 initiates communication with an external device, such as a PC or the like, and the SSR 102 enters the provisioning or programming state 314. During this state, the external device may program or interrogate information such as a serial number, units to display, and other data, stored in the non-volatile or flash memory 204 of the SSR 102. In some embodiments, upon detecting a logic "low" output from the AMR/AMI interface 220 for a predetermined period of time, such as more than 500 milliseconds, the microcontroller 200 ends communication with the AMR/AMI device and/or external device and the SSR 102 may transition back to the sleep mode 302 to conserve power.

In certain embodiments, the SSR 102 may be configured to operate in a test mode 318. For example, upon detecting a mode activation condition using the optical sensor 112 (as described in further detail below), the SSR 102 may transition from the sleep mode 302 to the test mode 318. In some embodiments, the SSR 102 may enter the test mode 318 from the LCD on state 308 upon detecting a mode activation condition using the optical sensor 112. During the test mode 318, the microcontroller 200 may activate or turn on the LCD 106 and the LCD 106 may display relative consumption information (consumption since the test mode 318 started), such as total flow volume (which may start at zero) using pre-programmed measurement units (e.g., gallons, cubic feet, cubic meters, liters, or imperial gallons) and/or rate of flow using pre-programmed measurement units (e.g., gallons/min, cubic feet/min, cubic meters/min, liters/min, or imperial gallons/min). In some embodiments, upon detecting a mode activation condition using the optical sensor 112 during the test mode 318, the SSR 102 transitions from the test mode 318 to the LCD on state 308. In further embodiments, the test mode 318 may be entered directly by receiving a signal through the AMR/AMI interface 220. Upon receiving the signal through the AMR/AMI interface 220, the SSR 102 may transition from the sleep mode 302 to the test mode 318.

Figure 4:
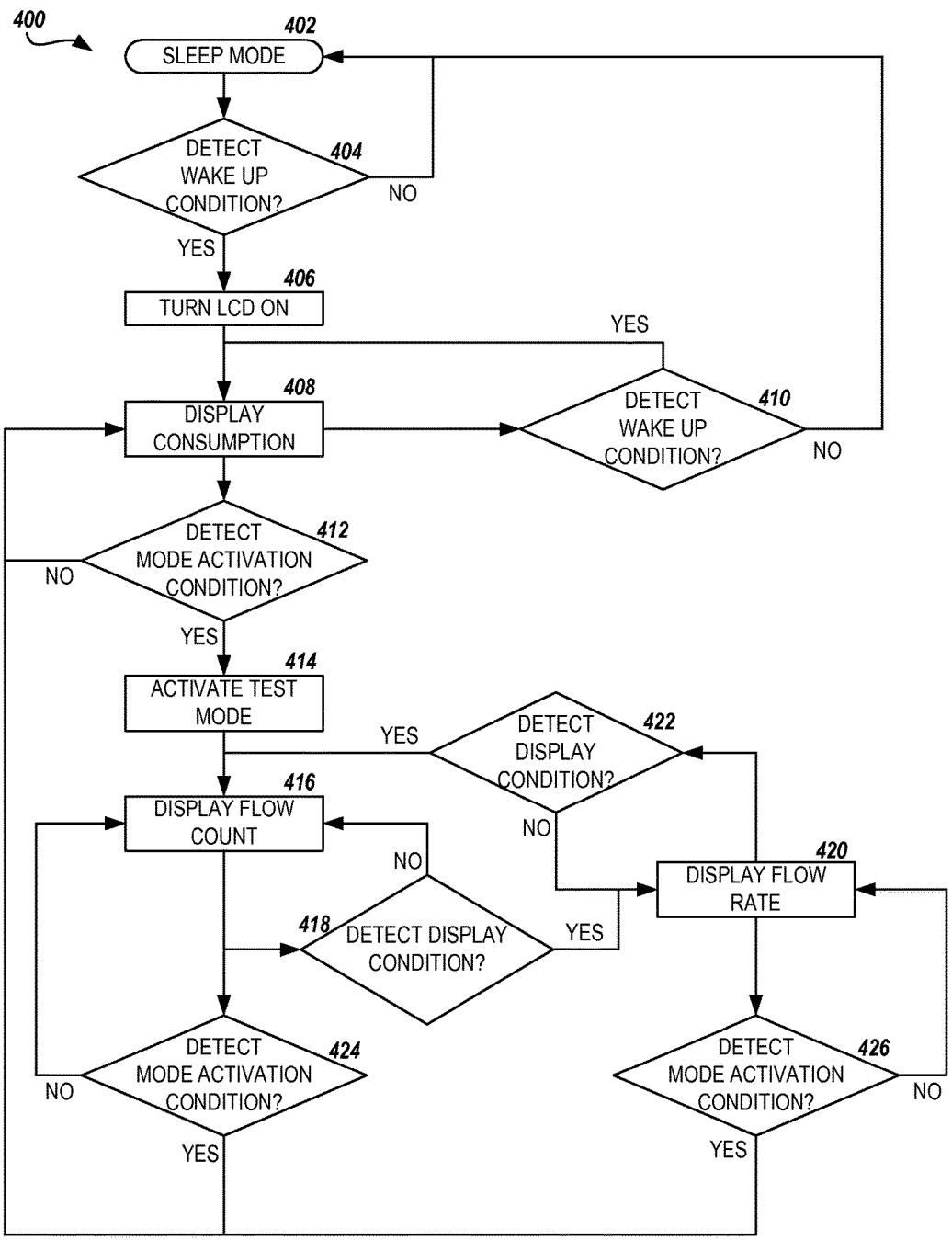
FIG. 4 is a flow diagram showing one routine for using light detection to activate one or more modes, according to embodiments described herein.

FIG. 4 is a flow diagram showing one method for using light detection to activate one or more modes, according to some embodiments. Specifically, FIG. 4 shows one routine 400 for activating and transitioning among various display states that may be implemented in the SSR 102. The routine 400 begins at step 402, where the SSR is in sleep mode 302. As described above, in the sleep mode 302, the microcontroller 200 may disable power to the LCD 106 to conserve power. The routine 400 proceeds from step 402 to step 404 where it is determined whether a wake up condition is detected. In certain embodiments, step 404 may be performed by the microcontroller 200 using information from the optical sensor 112. In some embodiments, the wake up condition comprises a transition in lighting conditions from light to dark, or from dark to light. Such a transition may occur, for example, when the SSR is in a dark environment and a flashlight is used to shine light on the optical sensor 112. For instance, a meter reader may carry a miniature LED flashlight (e.g., a flashlight key fob) on a keychain for ease of use in exposing the optical sensor 112 to light and triggering a wake up condition. In addition or alternatively, such a transition may occur when the SSR cover 128 is opened, thereby exposing the optical sensor 112 to external light sources, and/or when the SSR cover 128 is closed, thereby isolating the optical sensor 112 from external light sources. It will be appreciated that other techniques may be used to alter the lighting conditions detected by the optical sensor 112 and trigger a wake up condition, such as using a hand or other object to cover or expose the optical sensor 112 to external light sources or by leaving the SSR cover 128 open such that the sunrise or sunset causes a transition in lighting conditions.

As described above, during the sleep mode 302, the SSR 102 may enter a periodic task state 310 periodically, such as every 1 second or every 2 seconds, or at other predetermined times. During the periodic task state 310, the microcontroller 200 may sample the optical sensor 112 and receive a signal indicating the light level detected by the optical sensor 112. In accordance with certain embodiments, the optical sensor 112 may be configured to provide an output to the microprocessor 200 indicating if a detected light level is a lighted condition or a dark condition. The output of the optical sensor 112 may be a binary output, flag, or the like. For example, the optical sensor 112 may be configured with a light threshold, which may be a level of light above which is indicative of a lighted condition. The optical sensor 112 may also be configured with a dark threshold, which may be a level of light below which is indicative of a dark condition. In some embodiments, the light threshold is equal to the dark threshold. In certain embodiments, a hysteresis may be used such that the light threshold is different from the dark threshold. For instance, the optical sensor 112 may be configured with a light threshold of 550 lux (+/−15%), a 100 lux hysteresis, and a dark threshold of 450 lux (+/−15%). An output from the optical sensor 112 indicating a detected light level above the light threshold indicates that the optical sensor 112 is exposed to light or in a light state. An output from the optical sensor 112 indicating a detected light level below the dark threshold indicates that the optical sensor 112 is isolated from light or in a dark state.

The microprocessor 200 may be configured to compare a current output of the optical sensor 112 with a previous output of the optical sensor 112 (such as the output read by the microcontroller 200 during the last periodic task of sampling the optical sensor 112). The microprocessor may further be configured to detect a wake up condition if the current output and the previous output indicate a transition in lighting conditions (e.g., from a light state to a dark state or from a dark state to a light state). Thus, the microprocessor may be configured, in certain embodiments, to detect a wake up condition if the previous output indicates a light level below the dark threshold (e.g., 450 lux) and the current output indicates a light level above the light threshold (e.g., 550 lux), thereby indicating a transition from dark to light. In addition or alternatively, the microprocessor may be configured to detect a wake up condition if the previous output indicates a light level above the light threshold (e.g., 550 lux) and the current output indicates a light level below the dark threshold (e.g., 450 lux), thereby indicating a transition from light to dark. It will be appreciated by one of ordinary skill in the art that other techniques for detecting a transition in lighting conditions, such as detecting a significant change in the light level or other methods, may be used in various embodiments. As described above, in some embodiments, the microprocessor 200 may sample the optical sensor 112 every 1 second or every 2 seconds while the SSR 102 is in the sleep mode 302, thereby detecting a wake up condition upon a relatively rapid transition in lighting conditions.

If, at step 404, the wake up condition is not detected, the routine 400 returns to step 402 and the SSR 102 remains in the sleep mode 302 with the LCD 106 off. If a wake up condition is detected, the routine 400 proceeds to step 406 wherein the microcontroller 200 provides power to the LCD 106 to turn the LCD 106 on. Thus, upon detecting a wake up condition, the SSR 102 may transition from the sleep mode 302 to the LCD on state 308. Next, the routine 400 proceeds from step 406 to step 408 wherein the LCD 106 displays consumption information as described above. From step 408, the routine 400 may proceed to step 410 wherein the microprocessor 200 determines whether a wake up condition is detected. As described above, the SSR 102 may enter a periodic task state 310 periodically, wherein the microcontroller 200 may sample the optical sensor 112 and receive a signal indicating the light level detected by the optical sensor 112. During the LCD on state 308, the SSR 102 may enter the periodic task state more frequently than when in the sleep mode 302, such as every 125 milliseconds as compared to every 1 second or every 2 seconds. If a wake up condition is detected, the routine 400 returns to step 408 and the LCD 106 continues to display consumption information. In some embodiments, if no wake-up condition is detected by the optical sensor 112 for a predetermined period, such as 30 seconds, the routine 400 returns to step 402 wherein the SSR 102 may transition back to the sleep mode 302 and turn off the LCD 106 to conserve power.

In addition or alternatively, the routine 400 may proceed from step 408 to step 412 wherein it is determined whether a mode activation condition is detected. In certain embodiments, step 412 may be performed by the microcontroller 200 using information from the optical sensor 112. In some embodiments, the mode activation condition comprises a plurality of transitions in lighting conditions from light to dark, or from dark to light within a predetermined time period. For example, the mode activation condition may comprise 3 transitions from dark to light within 3 seconds. Such a transition may occur, for example, when the SSR is in a dark environment and a flashlight is used to shine light on the optical sensor 112 three times within three seconds. For instance, a meter reader may carry a miniature LED flashlight (e.g., a flashlight key fob) on a keychain for ease of use in exposing the optical sensor 112 to light and triggering a mode activation condition. In addition or alternatively, such a transition may occur when the SSR cover 128 is opened and closed multiple times over a predetermined period, thereby alternately exposing and isolating the optical sensor 112 from external light sources. It will be appreciated that other techniques may be used to alter the lighting conditions detected by the optical sensor 112 and trigger a mode activation condition, such as using a hand or other object to cover or expose the optical sensor 112 to external light sources.

As described above, during the LCD on state 308, the SSR 102 may enter a periodic task state 310 periodically, such as every 125 milliseconds, or at other predetermined times, wherein the microcontroller 200 may sample the optical sensor 112 and receive a signal indicating the light level detected by the optical sensor 112. The microprocessor 200 may be configured to compare multiple outputs of the optical sensor 112 (such as the outputs read by the microcontroller 200 during the last several samplings of the optical sensor 112). The microprocessor may further be configured to detect a mode activation condition if the outputs of the optical sensor 112 indicate a plurality of transitions in lighting conditions (e.g., from a light state to a dark state or from a dark state to a light state) within a predetermined time period, such as 3 transitions within 3 seconds.

If, at step 412, the mode activation condition is not detected, the routine 400 returns to step 408 and the LCD 106 continues to display consumption information. If a mode activation condition is detected, the routine 400 proceeds to step 414 wherein the SSR activates and transitions to the test mode 318. During the test mode 318, the microcontroller 200 may send signals to the LCD 106 causing the LCD 106 to switch from displaying normal consumption information to displaying relative consumption information for testing purposes. In some embodiments, the LCD 106 may display a "TEST" message, icon, or other indication that the SSR 102 is in the test mode 318. The routine 400 may proceed from step 414 to step 416 wherein the LCD 106 displays a flow count or total flow volume (which may start at zero) using pre-programmed measurement units (e.g., gallons, cubic feet, cubic meters, liters, or imperial gallons).

In some embodiments, the SSR 102 may be configured to allow a user to toggle between two or more display states using light detection. For example, the routine 400 may proceed from step 416 to step 418 wherein it is determined whether a display condition is detected. In certain embodiments, step 418 may be performed by the microcontroller 200 using information from the optical sensor 112. In some embodiments, the display condition comprises a transition in lighting conditions from light to dark, or from dark to light, just as or similar to a wake up condition. Such a transition may occur, for example, when the SSR is in a dark environment and a flashlight is used to shine light on the optical sensor 112. For instance, a meter reader may carry a miniature LED flashlight (e.g., a flashlight key fob) on a keychain for ease of use in exposing the optical sensor 112 to light and triggering a display condition. In addition or alternatively, such a transition may occur when the SSR cover 128 is opened, thereby exposing the optical sensor 112 to external light sources, and/or when the SSR cover 128 is closed, thereby isolating the optical sensor 112 from external light sources. It will be appreciated that other techniques may be used to alter the lighting conditions detected by the optical sensor 112 and trigger a display condition, such as using a hand or other object to cover or expose the optical sensor 112 to external light sources.

If the display condition is not detected, the routine 400 returns to step 416 and the LCD 106 continues to display flow count information. If a display condition is detected, the routine 400 proceeds from step 418 to step 420 wherein the microcontroller 200 may send signals to the LCD 106 causing the LCD 106 to switch from displaying the flow count to displaying a flow rate using pre-programmed measurement units (e.g., gallons/min, cubic feet/min, cubic meters/min, liters/min, or imperial gallons/min).

From step 420, the routine 400 may proceed to step 422 wherein it is determined whether a display condition is detected. If the display condition is not detected, the routine 400 returns to step 420 and the LCD 106 continues to display flow rate information. If a display condition is detected, the routine 400 proceeds from step 422 to step 416 wherein the microcontroller 200 may send signals to the LCD 106 causing the LCD 106 to switch from displaying the flow rate to displaying a flow count. It will be appreciated that, in certain embodiments, the use of light detection by the SSR 102 allows a meter reader or other utility technician to toggle back and forth between display states, such as a flow count display and a flow rate display, in accordance with steps 416, 418, 420, and 422 described herein. Similar methods may be employed to transition among various additional display states as will be appreciated by one of ordinary skill in the art.

In some embodiments, during the test mode 318, the microcontroller 200 may sample the optical sensor 112 periodically, such as every 125 milliseconds, or at other predetermined times, and determine whether a mode activation condition is detected. Accordingly, when the LCD 106 is displaying flow count information at step 416, the routine 400 may proceed to step 424 wherein it is determined whether a mode activation condition is detected. Similarly, when the LCD 106 is displaying flow rate information at step 420, the routine 400 may proceed to step 426 wherein it is determined whether a mode activation condition is detected. As described above, the mode activation condition may comprise a plurality of transitions in lighting conditions from light to dark, or from dark to light within a predetermined time period. For example, the mode activation condition may comprise 3 transitions from dark to light within 3 seconds. If at step 424 the mode activation condition is not detected, the routine 400 returns to step 416 and the LCD 106 continues to display flow count information. Similarly, if at step 426 the mode activation condition is not detected, the routine 400 returns to step 420 and the LCD 106 continues to display flow rate information. If at step 424 and/or at step 426 a mode activation condition is detected, the routine 400 proceeds to step 408 wherein the SSR activates and transitions to the LCD on state 308 and the microcontroller 200 may send signals to the LCD 106 causing the LCD 106 to switch from displaying relative consumption information to displaying normal consumption information. In some embodiments, the routine 400 may proceed from step 424 and/or step 426 to step 408 and transition from the test mode 318 to the LCD on state 308 if no mode activation condition is detected for a predetermined time period, such as 120 minutes.

Figure 5:
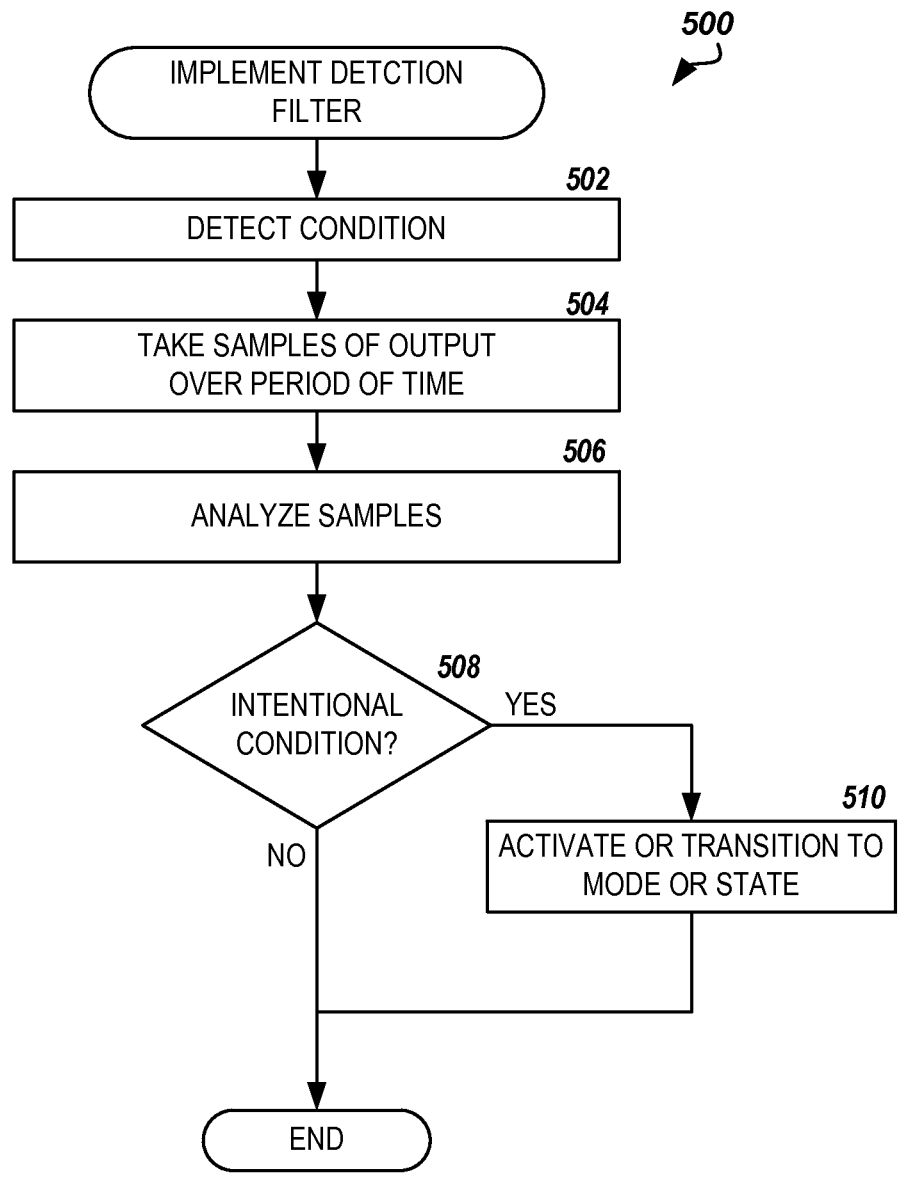
FIG. 5 is a flow diagram showing one routine for implementing a detection filter, according to embodiments described herein.

FIG. 5 is a flow diagram showing one method for implementing a detection filter to avoid potential problems when using light detection to activate one or more modes, according to some embodiments. Specifically, FIG. 5 shows one routine 500 for implementing a detection filter in the SSR 102 to identify and differentiate between intentional conditions and unintentional conditions so that the SSR 102 may only act on intentional conditions. As described above, in some embodiments the wake up condition and/or the display condition may comprise a transition in lighting conditions from light to dark, or from dark to light. For example, the wake up condition and/or the display condition may comprise 1 transition from dark to light within 1 second (an exemplary sampling rate for reading the optical sensor 112). The wake up condition and/or the display condition may be intentionally triggered, for instance when the SSR 102 is in a dark environment and a meter reader flashes a flashlight on the optical sensor 112 in order to cause the SSR 102 to activate or transition to another mode or state. As also described above, in some embodiments the mode activation condition comprises a plurality of transitions in lighting conditions from light to dark, or from dark to light within a predetermined time period. For example, the mode activation condition may comprise 3 transitions from dark to light within 3 seconds. The mode activation condition may be intentionally triggered, for instance, when a meter reader flashes a flashlight on the optical sensor 112 three times in three seconds in order to cause the SSR 102 to activate or transition to another mode or state.

Certain lighting conditions, however, may pose a risk of unintentionally causing the SSR 102 to detect a condition, such as the wake up condition, display condition or mode activation condition. As one example, fluorescent lamps flicker at a normally unnoticeable frequency, such as 100 or 120 Hz. Thus, in some embodiments, when the SSR cover 128 is open and the optical sensor 122 within the SSR 102 is exposed to fluorescent lighting, for instance, the flicker of the fluorescent lamps may result in 1 transition from dark to light within 1 second and/or 3 transitions from dark to light within 3 seconds, which may be inadvertently detected by the optical sensor 112 and microprocessor 200 as a wake up condition, display condition, and/or a mode activation condition.

In order to prevent the SSR 102 from acting on an unintentional condition, the SSR 102 may in some embodiments be configured to implement a detection filter, one embodiment of which is shown in FIG. 5. In some embodiments, using the detection filter the SSR 102 is configured to distinguish between steady-state light sources, which may be used to intentionally cause a condition, and flickering light sources, which may unintentionally cause a condition. With reference to FIG. 4, the SSR 102 may implement the detection filter as part of or in connection with steps 404, 410, 412, 418, 422, 424, and/or 426.

The routine 500 for implementing a detection filter shown in FIG. 5 begins at step 502 wherein the SSR 102 detects a condition. For example, the microprocessor 200 may detect a wake up condition, display condition, or a mode activation condition as previously described, or some other like condition using information from the optical sensor 112. Next, the routine 500 proceeds to step 504 wherein the microprocessor 200 takes a plurality of samples or readings of the output of the optical sensor 112 over a period of time. For example, the microprocessor 200 may be configured to take 64 samples of the output of the optical sensor 112 over 8.3 milliseconds. In such an embodiment, the period of 8.3 milliseconds is chosen because a fluorescent lamp flickering at 120 Hz will turn on twice in 8.3 milliseconds: 1 second÷120 cycles/second×1000 milliseconds/second=8.3 milliseconds/cycle, wherein the positive and negative cycles of the AC current results in the lamp turning on twice per cycle. It will be appreciated that other periods may be chosen that take the flickering frequency of the external lighting source into account.

From step 504, the routine 500 proceeds to step 506 wherein the samples are analyzed. For example, in some embodiments the microprocessor 200 may be configured to determine how many of the samples from the optical sensor 112 indicate a lighted condition.

Next, the routine 500 proceeds to step 508 wherein it is determined whether the detected condition is an intentional condition. In some embodiments, the microprocessor 200 may compare the number of samples that indicate a lighted condition to a steady-state threshold. The steady-state threshold may be a number or percentage of the samples taken from the optical sensor 112 which indicates that the light detected by the optical sensor 112 originates from a steady-state light source, such as a flashlight, as opposed to a flickering light source, such as a fluorescent lamp. The microprocessor 200 may further be configured to determine that the detected condition is an intentional condition if the number of samples that indicate a lighted condition exceed the steady-state threshold. For example, in one embodiment, upon determining that 60 or more of the 64 samples taken over 8.3 milliseconds indicate a lighted condition, the microprocessor 200 may determine that the detected condition is an intentional condition.

If, at step 508, the detected condition is determined to be an intentional condition, the routine 500 proceeds to step 510 wherein the SSR 102 activates or transitions to the mode or state in accordance with the detected condition. For example, the SSR 102 may transition from the sleep mode 302 to the LCD on state 308 in accordance with a detected wake up condition or activate the test mode 318 in accordance with a detected mode activation condition. If the detected condition is determined not to be an intentional condition, the routine 500 ends, thereby avoiding unintentional activation or transition to a mode or state.

Based on the foregoing, it will be appreciated that technologies for activating modes using light detection are presented herein. While embodiments are described herein in regard to an SSR 102 implemented in a water meter 100, it will be appreciated that technologies described herein may be utilized in any programmable or configurable solid-state or electronic meter that operates in various modes or states to measure, display, and/or report the flow of any product. The above-described embodiments are merely possible examples of implementations, set forth for a clear understanding of the principles of the present disclosure.

The logical operations, functions or steps described herein as part of a method, process or routine may be implemented (1) as a sequence of processor-implemented acts, software modules or portions of code running on a microcontroller, processing unit, or other computing system and/or (2) as interconnected machine logic circuits or circuit modules within the microcontroller, processing unit or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method for activating one or more operating modes of a register in a meter, the method comprising steps of:
   operating the register in a first mode;
   detecting, by a microcontroller in the register, a first lighting condition comprising a plurality of transitions from light to dark or dark to light within a first detection period;
   upon detecting the first lighting condition, operating the register in a second mode;
   detecting, by the microcontroller, a second lighting condition comprising a plurality of transitions from light to dark or dark to light within a second detection period;
   upon detecting the second lighting condition, operating the register in a third mode;
   detecting, by the microcontroller, a third lighting condition comprising a plurality of transitions from light to dark or dark to light within a third detection period; and
   upon detecting the third lighting condition, operating the register in the second mode.

2. The method of claim 1, wherein the first mode comprises a sleep mode and wherein operating the register in the second mode comprises activating, by the microcontroller, a display of the register.

3. The method of claim 1, wherein operating the register in the second mode comprises displaying, by a display connected to the microcontroller, normal consumption information and wherein operating the register in the third mode comprises displaying, by the display, test consumption information.

4. The method of claim 1, further comprising detecting an unintentional lighting condition by performing steps of:
   taking, by the microcontroller, a plurality of light readings over a period of time;
   determining, by the microcontroller, a number of light readings that indicate a lighted condition;
   comparing, by the microcontroller, the number of light readings indicating a lighted condition to a steady-state threshold;
   upon determining that the number of light readings indicating a lighted condition falls below the steady-state threshold, determining that the unintentional lighting condition is detected; and
   upon determining the unintentional lighting condition, continue operating the register in the first mode.

5. The method of claim 4, wherein the unintentional lighting condition comprises an indication that the register is exposed to fluorescent lighting.

6. The method of claim 1, wherein the first detection period is three seconds comprising of three transitions of light to dark and three transitions of dark to light.

7. The method of claim 1, wherein the register further comprises an optical sensor configured to provide an output to the microcontroller.

8. The method of claim 7, wherein the optical sensor is configured to determine light utilizing a light threshold and determine dark utilizing a dark threshold.

9. A computer-readable storage medium having processor-executable instructions stored thereon that, when executed by a processing unit, cause the processing unit to:
   operate a register in a first mode;
   detect a first lighting condition comprising a plurality of transitions from light to dark or dark to light within a first detection period;
   take a plurality of light readings over a period of time;
   determine a number of light readings that indicate a lighted condition;
   compare the number of light readings indicating a lighted condition to a steady-state threshold;
   upon determining that the number of light readings indicating a lighted condition falls below the steady-state threshold, determine that an unintentional lighting condition is detected and continue to operate the register in the first mode;
   upon detecting the first lighting condition and determining that the number of light readings indicating a lighted condition is above the steady-state threshold, operate the register in a second mode;
   detect a second lighting condition comprising a plurality of transitions from light to dark or dark to light within a second detection period;
   upon detecting the second lighting condition and determining that the number of light readings indicating a lighted condition is above the steady-state threshold, operate the register in a third mode;
   detect a third lighting condition comprising a plurality of transitions from light to dark or dark to light within a third detection period; and
   upon detecting the third lighting condition and determining that the number of light readings indicating a lighted condition is above the steady-state threshold, operate the register in the second mode.

10. The computer-readable storage medium of claim 9, wherein the first mode comprises a sleep mode and wherein operating the register in the second mode comprises activating a display of the register.

11. The computer-readable storage medium of claim 9, wherein operating the register in the second mode comprises causing a display of the register to display normal consumption information and wherein operating the register in the third mode comprises causing the display to display test consumption information.

12. The computer-readable storage medium of claim 9, wherein the processing unit is implemented in a solid-state register of a water meter assembly.

13. The computer-readable storage medium of claim 9, wherein the unintentional lighting condition comprises an indication that the register is exposed to fluorescent lighting.

14. A register for use in a meter, the register comprising:
an optical sensor configured to generate outputs indicative of detected light levels; and
a microcontroller connected to the optical sensor, the microcontroller configured to
operate the register in a first mode;
detect a first lighting condition comprising a plurality of transitions from light to dark or dark to light within a first detection period;
upon detecting the first lighting condition, operate the register in a second mode;
detect a second lighting condition comprising a plurality of transitions from light to dark or dark to light within a second detection period;
upon detecting the second lighting condition, operate the register in a third mode;
detect a third lighting condition comprising a plurality of transitions from light to dark or dark to light within a third detection period; and
upon detecting the third lighting condition, operate the register in the second mode.

15. The register of claim 14, wherein the microcontroller is further configured to:
take a plurality of light readings over a period of time;
determine a number of light readings that indicate a lighted condition;
compare the number of light readings indicating a lighted condition to a steady-state threshold;
upon determining that the number of light readings indicating a lighted condition falls below the steady-state threshold, determine that an unintentional lighting condition is detected; and
upon detecting the unintentional lighting condition, continue operating the register in the first mode.

16. The register of claim 15, wherein the unintentional lighting condition comprises an indication that the register is exposed to fluorescent lighting.

17. The register of claim 14, wherein the optical sensor is configured to determine light utilizing a light threshold and determine dark utilizing a dark threshold.

* * * * *